(12) United States Patent
Kacavenda

(10) Patent No.: US 10,459,246 B2
(45) Date of Patent: Oct. 29, 2019

(54) FLEXIBLE HINGE WITH A TENSION SPRING

(71) Applicant: OKIA OPTICAL CO., LTD., Hong Kong (CN)

(72) Inventor: Milan Kacavenda, Banja Luka (BA)

(73) Assignee: OKIA OPTICAL CO., LTD., Hong Kong (CN)

( * ) Notice: Subject to any disclaimer, the term of this patent is extended or adjusted under 35 U.S.C. 154(b) by 0 days.

(21) Appl. No.: 16/069,489

(22) PCT Filed: Jan. 10, 2017

(86) PCT No.: PCT/CN2017/070710
§ 371 (c)(1),
(2) Date: Jul. 11, 2018

(87) PCT Pub. No.: WO2017/121306
PCT Pub. Date: Jul. 20, 2017

(65) Prior Publication Data
US 2019/0033616 A1 Jan. 31, 2019

(30) Foreign Application Priority Data
Jan. 14, 2016 (BA) .................................. 163113A

(51) Int. Cl.
*G02C 5/22* (2006.01)
(52) U.S. Cl.
CPC ......... *G02C 5/2236* (2013.01); *G02C 5/2227* (2013.01); *G02C 2200/24* (2013.01); *G02C 2200/26* (2013.01)

(58) Field of Classification Search
CPC ...... E05D 7/10; G02C 5/2218; G02C 5/2236; G02C 5/02; G02C 5/2227; G02C 5/14;
(Continued)

(56) References Cited

U.S. PATENT DOCUMENTS 4,222,148 A * 9/1980 Zellweger ............ G02C 5/2227
16/228
4,674,147 A 6/1987 Drlik
(Continued)

FOREIGN PATENT DOCUMENTS

CN 203981999 U 12/2014

OTHER PUBLICATIONS

International Search Report of PCT/CN2017/070710.
Written Opinion of PCT/CN2017/070710.

*Primary Examiner* — Chuck Y Mah
(74) *Attorney, Agent, or Firm* — Squire Patton Boggs (US) LLP

(57) ABSTRACT

Provided herein is a flexible hinge comprising a tension spring (1), a sliding element (2), a sliding element guide (3), a spring tensioner (4), a stop (5) for stopping the longitudinal movement of the sliding element (2), a fastener (6), and a bearing shield (7). The flexible hinge disclosed herein can be installed in a pair of eyeglasses comprising a pair of temples and a frame front so as to connect the temples to the frame front. The flexible hinge can be fixed to the temple with the stop (5) at one end and to the frame front with the fastener (6) at another end. The fastener (6) is used to engage sliding element (2) with the bearing shield (7). The sliding element guide (3) enables longitudinal movement of the sliding element (2) along the x-axis and prevents its movement along other axes.

18 Claims, 6 Drawing Sheets

(58) Field of Classification Search
CPC ...... G02C 5/16; G02C 5/2209; G02C 5/2254; G02C 5/2263; G02C 5/2272; G02C 5/2281; G02C 5/229; G02C 2200/06; G02C 2200/20
See application file for complete search history.

(56) References Cited

U.S. PATENT DOCUMENTS

| | | | |
|---|---|---|---|
| 4,747,183 A | 5/1988 | Drlik | |
| 4,818,093 A * | 4/1989 | Tabacchi | G02C 5/2245 16/228 |
| 5,495,304 A * | 2/1996 | Baines | G02C 5/14 351/113 |
| 5,739,891 A * | 4/1998 | Wei | G02C 5/2209 16/228 |
| 6,353,965 B1 * | 3/2002 | Lo | G02C 5/2236 16/228 |
| 6,381,807 B1 * | 5/2002 | Hsu | G02C 5/2227 16/228 |
| 7,249,845 B2 * | 7/2007 | Fiehn | G02C 5/2236 16/228 |
| 7,380,935 B2 * | 6/2008 | Ifergan | G02C 5/10 351/153 |
| 8,684,518 B2 * | 4/2014 | Gasparetto | G02C 5/22 16/228 |
| 2004/0207806 A1 * | 10/2004 | Kerjean | G02C 5/2236 351/153 |
| 2009/0047061 A1 * | 2/2009 | Chene | B25J 17/0258 403/65 |
| 2012/0307198 A1 * | 12/2012 | Ifergan | G02C 5/10 351/153 |
| 2017/0139229 A1 * | 5/2017 | Montalban | E05D 3/022 |

* cited by examiner

FLEXIBLE HINGE WITH A TENSION SPRING

CROSS-REFERENCES TO RELATED APPLICATIONS

This PCT application claims priority to Bosnia and Herzegovina Patent Application No. BAP163113A, filed 14 Jan. 2016, which is incorporated by reference herein in its entirety.

FIELD OF THE INVENTION

This invention is related to a flexible hinge with a tension spring for use in eyeglasses or eyewear. According to the international classification (MPK), it is classified as G02 C 5/22.

BACKGROUND OF THE INVENTION

It is a technical problem to make a precise bearing in the handle (aka temple) of glasses or eyewear along which the sliding mechanism for closing of temples will longitudinally move. This problem is even more emphasized when the glasses are generally manufactured from the milled plastic or similar materials, because, at materials with lower-quality material characteristics, it occurs the wearing of the bearing and appearance of the unacceptable and unwanted movements of the temples in comparison to the front part (aka frame front).

The technical problem is to do the milling of the bearing of the mechanism slider in any material if the depth of the milling is significantly higher than the diameter of the mill with which the bearing of the temple slider is done.

The technical problem is to do the compression of the tension spring in the assembling phase.

The technical problem is fixing the end of the spring with the temple in its inner part.

The technical problem is to make a reliable and affordable stop for the movement of the sliding mechanism in the temple of the glasses which would limit the movement of the sliders to all of the positions of the temple, and that the assembly of the stop is quick and efficient.

The technical problem is to make a sliding mechanism and avoid any mechanical processing such as milling, because the width of the channel is small in comparison to the depth of the channel, the price of such processing is very high and it is basically an unacceptable way of manufacture of the mechanism of the flexible hinge.

The technical problem is to make glasses that will have a possibility of vertical movement of the temples in relation to the frame front and the possibility of the flexible opening of these temples from the position when the temples are closed up to the position of the maximum opening of the temple, which basically means the circular movement of the temple in all of its positions in relation to the frame front.

The technical problem is to make glasses in the way that vertical movement of the temples in relation to the frame fronts is possible only with an application of a force and that the mechanism of the flexible hinge automatically brings back the temple to the starting position.

The technical problem is to provide a possibility of vertical movement of the temple with the application of the force and the automatic return to the starting position without the application of the force in all the positions of the temple in relation to the frame front.

The technical problem is to make a mechanism which will cost as less as possible and assure that the assembly of the mechanism in the temple and to the frame front is fast, reliable and economical.

The technical problem is to avoid any extra work in the final assembly such as oiling, registration of the faulty incumbency of the temple onto the frame front, regulation of the strength of the bolt tension around which the temple rotates.

The technical problem is to make a reliable and strong mechanism for temple closing and that all the parts of the mechanism are placed into the temple and the frame front, and ultimately invisible.

The technical problem is to enable manufacturers of the glasses, who use materials which cannot be heated or glued, to efficiently build my mechanism into any sort of material.

The technical problem is to make a mechanical stop for the movement of the sliding element and in that way prevent damage of the spring due to the excessive tension.

The technical problem is to mount the slider of the mechanism which is connected to the tension spring to the frame front fast and in the process of the serial manufacture.

The applicant does not know if there is a flexible hinge which has a possibility of the circular movement and automatic return to the starting position, no matter from which position the rotation of the temple starts comparing to the frame front, and that the price is far lower than prices of all the other hinges with the similar technical characteristics. There is not a flexible mechanism which uses the tension spring and that the spring is, at the same time, already compressed or stretched up to the point from which it will start operating in the phase of the opening and closing of the temple.

The patent application BAP 112839A of Feb. 3, 2011 describes the way of the assembly of the spring into the temple of the glasses and its compression up to the point from which it will start operating during the opening and closing of the temple.

There are four basic reasons which caused the product subject to this application not to find its way to the market. The first reason is inability to mill such a deep bearing in the plastic, aluminum and titanium. The second reason is the way in which the fixed end of the spring is fixed to the temple of the glasses because it means making another hole in the temple and putting another bolt. The third reason is the very high price of the milling slider mechanism. The forth reason is the inability to make a precise bearing for the sliding mechanism because the bearing is done in the same material as is the temple, so the possibility for a mistake is huge due to the more factors. Also, the bearing of the sliding mechanism was exposed to wearing due to the longitudinal movement of the sliding mechanism in the bearing of the temple.

BRIEF SUMMARY OF THE INVENTION

The main goal of this invention is to make such hinge which would have a possibility of a flexible movement in relation to its front part (aka frame front) to all directions and the characteristic that the handle (aka temple) automatically returns to its original position, where all the parts of the mechanism would be hidden in the temple and would not be visible, and that the total price of the mechanism, together with the necessary works in the manufacturing phase of the glasses and the mounting the mechanism to the glasses, does not surpass the price of the traditional flexible hinges. In this way, the best ratio quality-price is guaranteed and the deciding advantage on the market is achieved.

The further goal of the invention is to make such hinge which will guarantee the protection to the final user and unable the accidental breakage of the temples such as sport accidents, traffic accidents, and particularly, the accidents during the explosion of the air bags.

The further goal of the invention is to make such hinge which would be mounted in all phases in cold processing and enable application of this hinge to different materials, and enable mounting even to those materials that cannot be heated in any phase.

The further goal is to make such hinge which has slider of the mechanism made of tin, which can be bent in the cold conditions and which costs far less than the mechanically processed slider or metal-cast slider.

The further goal is to provide wearing protection for the bearing of the slider made in the temple as the tin-made slider would damage the bearing during the longitudinal movement which flexible hinges in the operating phase.

The further goal of the invention is to make a reliable and easy stop of the longitudinal movement of the slider in order to prevent compression of the spring larger than the spring can temple and in such way prevent the spring from damage and enable the long-term operation.

In one aspect, provide herein is a flexible hinge with a tension spring comprising or consisting of a tension spring (1), a sliding element (2), a sliding element guide (3), a spring tensioner (4), a stop (5) for stopping the longitudinal movement of the sliding element (2), a fastener or bolt (6), a bearing shield (7), a frame front (8) and a temple (9), wherein the entire structure is characterized in that the sliding element (2) is made of sheet metal which is bended, and that the sliding element guide (3) is fixed to the temple (9) with the fastener (6), which is at the same time the stop (5) for the longitudinal movement of the sliding element (2), and wherein the first segment (23) and the second segment (24) of the sliding element (2) slide along the x-axis through a pair of slots (33A) and 33(B) on the sliding element guide (3), while the tension spring (1) is compressed or stretched between the sliding element (2) and the spring tensioner (4), and wherein the spring tensioner (4) and the sliding element guide (3) is in permanent contact.

In some embodiments, the bearing shield (7) is fixed to the end of the frame front (8) characterized in that the outer form of the bearing shield (7) is identical to the form of a frame front bearing (88) made in the frame front (8), wherein the fastener (6) goes through a pair of bearing shield openings (71) and (72) in the bearing shield (7) and fixes the bearing shield to the frame front (8).

In certain embodiments, the spring tensioner (4) is in the shape of a round tube characterized in that the inner diameter of the tube that the spring tensioner (4) is made of is larger than the outer diameter of the tension spring (1), wherein stretching of the tension spring (1) is performed by pulling an end of the tension spring (1) by force through the tube of the spring tensioner (4) and fixing the end to a tensioner bearing (44) of the spring tensioner (4).

In another aspect, provide herein is a flexible hinge comprising:

a) a tension spring (1) having two ends (11) and (12);
b) a sliding element (2) having a first segment (23), a second segment (24), and an ending (26) between the first segment (23) and the second segment (24), wherein there is an opening (22) near the end of one of the first and second segments, and wherein the opening (22) is configured to engage with one end of the tension spring (1);
c) a sliding element guide (3) comprising a third segment (35), a fourth segment (36), a middle segments (34) between the third segment (35) and the fourth segment (36), and a pair of slots (33A) and (33B) in the middle segment (34), wherein the pair of slots (33A) and (33B) are configured to allow the first and second segments of the sliding element (2) to slide through, and wherein there is a first guide opening (31) and a second guide opening (32) in the third segment (35) and the fourth segment (36) respectively.
d) a spring tensioner (4) having a spring fixing device at one end configured to engage with the other end of the tension spring (1);
e) a stop (5) for stopping the longitudinal movement of the sliding element (2), wherein the stop (5) passes through the first guide opening (31) and second guide opening (32) in the sliding element guide (3);
f) a fastener (6); and
g) a bearing shield (7) having a pair of bearing shield openings (71) and (72), wherein the fastener (6) goes through the bearing shield openings (71) and (72) and the ending (26) to engage the bearing shield (7) with the rest of the flexible hinge.

In some embodiments, the spring tensioner (4), the sliding element guide (3), the sliding element (2) and the tension spring (1) are in permanent contact.

In certain embodiments, the opening (22) of the sliding element (2) engages with one end of the tension spring (1), wherein the first segment (23) and the second segment (24) of the sliding element (2) slide through the pair of slots (33A) and (33B) of the sliding element guide (3), and wherein the other end of the tension spring (1) is pulled by force through the spring tensioner (4) and fixed to a tensioner bearing (44) of the spring tensioner (4).

In some embodiments, the stop (5) passes through the guide openings (31) and (32) and a temple bore in a temple of a pair of eyeglasses to fix the sliding part guide (3) to the temple.

In certain embodiments, the slots (33A) and (33B) are configured to allow only the longitudinal movement of the sliding element (2), and to prevent all the other movements of the sliding element (2).

In some embodiments, the width of the slots (33A) or (33B) is slightly bigger than the thickness of the first segment (23) and the second segment (24).

In certain embodiments, the bearing shield (7) is embedded in a frame front bearing in one end of a frame front of a pair of eyeglasses, wherein the outer shape and dimensions of the bearing shield (7) are identical to or configured to suit the shape and dimensions of the frame front bearing.

In some embodiments, the fastener (6) goes through the bearing shield openings (71) and (72) and the ending (26), and fixes the bearing shield (7) to one end of a frame front of the pair of eyeglasses.

In certain embodiments, the spring tensioner (4) is in the shape of a round tube. In other embodiments, the inner diameter of the spring tensioner (4) is larger than the outer diameter of the tension spring (1).

In another aspect, provide herein is a pair of eyeglasses comprising a frame front (111); a pair of temples (110); and a pair of the flexible hinges of any one of claims 1-11, wherein the pair of the flexible hinges connect the pair of temples (110) to the frame front (111).

In some embodiments, the right and left ends of the frame front (111) comprise a pair of frame front bearings (88), wherein the bearing shield (7) of each of the flexible hinges is embedded in one of the frame front bearings (88), In certain embodiments, the outer shape and dimensions of the bearing shield (7) are identical to or configured to suit the shape and dimensions of the frame front bearing.

In some embodiments, the pair of temples (110) has a temple bore (95), and wherein the stop (5) passes through the guide openings (31) and (32) and a temple bore (95) to fix the sliding part guide (3) to the temple (110).

In certain embodiments, the fastener (6) goes through the bearing shield openings (71) and (72) of the bearing shield (7) and the ending (26) of the sliding element (2), and fixes one of the flexible hinges to one end of the frame front.

In another aspect, provide herein is a pair of eyeglasses comprising a frame front; a pair of temples; a pair of the flexible hinges of any one of claims 1-11; and a pair of hinge connectors (100), wherein the pair of hinge connectors couple with the pair of flexible hinges to form a pair of extended flexible hinges, and wherein the pair of extended flexible hinges connect the pair of temples to the frame front.

In some embodiments, each of the hinge connector (100) comprises a cavity (104), a pair of connector openings (101) and (102) and a connector bore (103), wherein the pair of connector openings (101) and (102) is configured to suit the bearing shield openings (71) and (72) of the bearing shield (7) and the connector bore (103) is configured to engage with the frame front.

In certain embodiments, the outer shape and dimensions of the bearing shield (7) are identical to or configured to suit the shape and dimensions of the cavity (104).

DETAILED DESCRIPTION OF THE INVENTION

The following description is presented to enable one of ordinary skill in the art to make and use the examples and embodiments set forth herein and to incorporate the same in the context of particular applications. Various modifications, as well as a variety of uses in different applications will be readily apparent to those skilled in the art, and the general principles defined herein may be applied to a wide range of embodiments. Thus, the instant disclosure is not intended to be limited to the embodiments presented, but is to be accorded the widest scope consistent with the principles and novel features disclosed herein.

The reader's attention is directed to all papers and documents which are filed concurrently with this specification and which are open to public inspection with this specification, and the contents of all such papers and documents are incorporated herein by reference. Unless expressly stated otherwise, each feature disclosed is one example only of a generic series of equivalent or similar features.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIGS. 1-11 are simplified diagrams illustrating embodiments of the flexible hinge of the present invention. These diagrams are merely examples, which should not unduly limit the scope of the claims. One of ordinary skill in the art would recognize many variations, alternatives, and modifications of the embodiments as shown in FIGS. 1-11.

Figure 8:
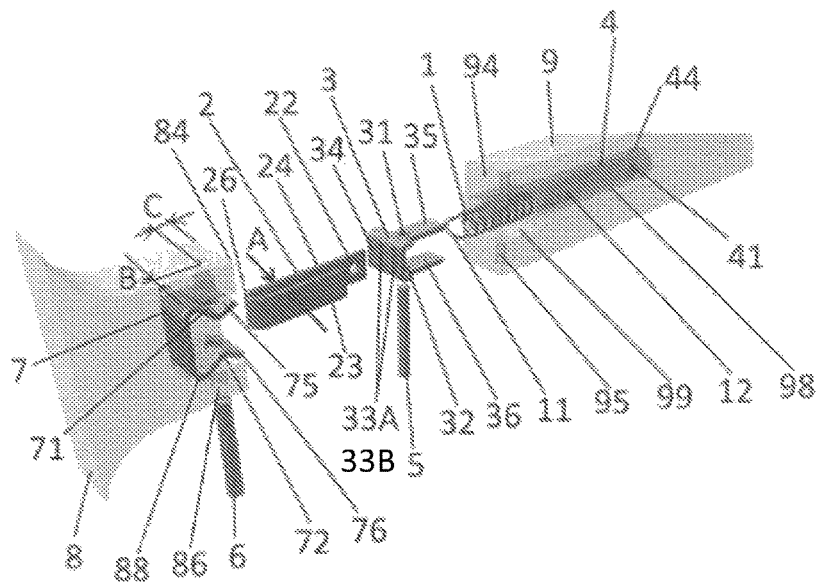
FIG. 8 depicts an exploded view of an embodiment of the flexible hinge disclosed herein.
Figure 9:
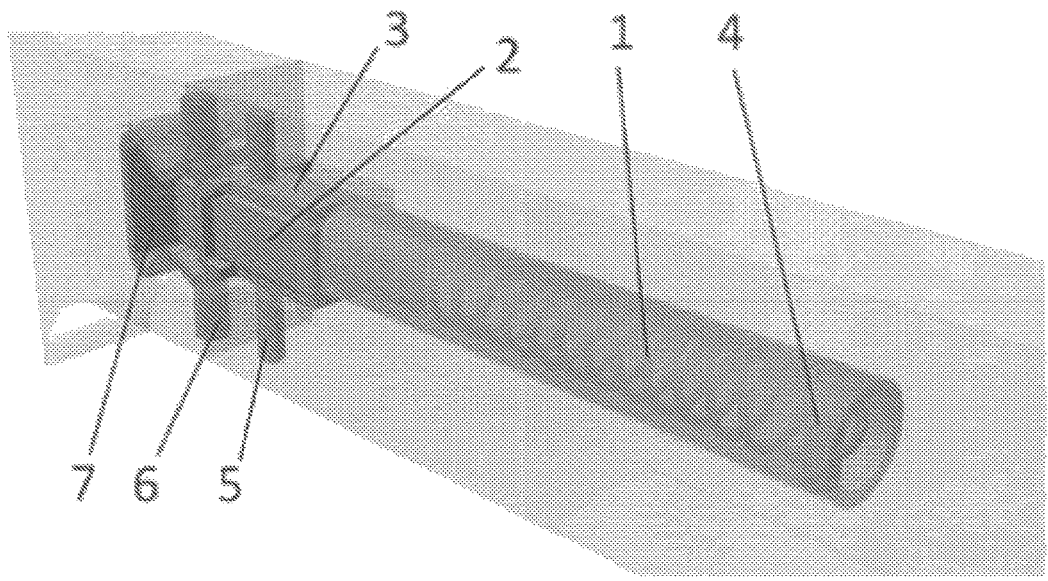
FIG. 9 depicts an assembled view of the flexible hinge of FIG. 8.

Referring to FIGS. 8 and 9, the flexible hinge comprises or consists of a tension spring (1), a sliding element (2), a sliding element guide (3), a spring tensioner or compressor (4), a stop (5) for stopping the longitudinal movement of the sliding element (2), a fastener (6), a bearing shield (7), a frame front bearing (88) in a frame front (8) wherein the frame front bearing (88) is configured to engage with the bearing shield (7), a temple (9), and a temple bearing (99) in the temple wherein the temple bearing (99) is configured to engage with the spring tensioner (4).

Figure 1:
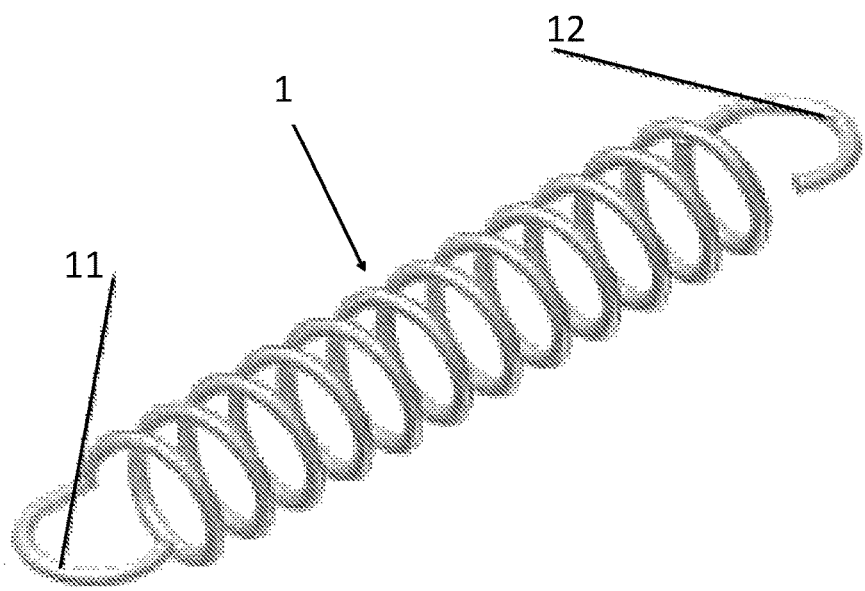
FIG. 1 depicts an embodiment of the tension spring disclosed herein.

Referring to FIG. 1, the tension spring (1) has an ending (11) that is fixed to the sliding element (2) and an ending (12) which is fixed to the spring tensioner (4).

Figure 2:
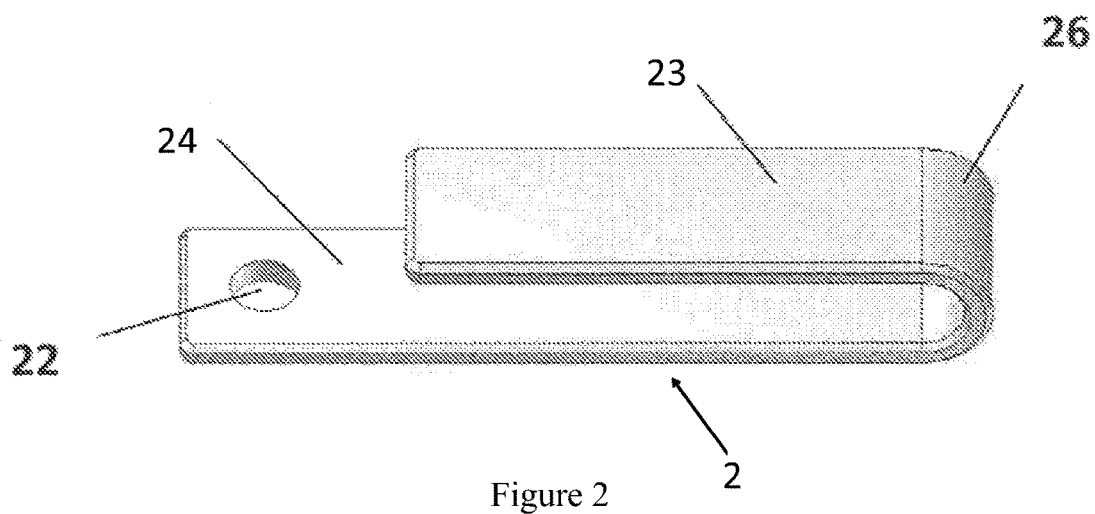
FIG. 2 depicts an embodiment of the sliding element disclosed herein.

Referring to FIG. 2, the sliding element (2) can be made of any suitable metal such as stainless steel. In some embodiments, the sliding element (2) is made of a metal sheet and is bended in the shape of a substantially letter U. The sliding element (2) comprises or consists of a first segment (23) and a second segment (24), an ending (26), and an opening (22) to which the ending (11) of the tension spring (1) is fixed.

Referring to FIG. 8, the width (A) of the sliding element (2) is constant along the length of the first segment (23) and it is slightly bigger than the diameter of the fastener (6) in order to enable rotation and vertical movement of the temple (9) against the frame front (8). The rotation of the fastener (6) is carried out in the ending (26). The first and second segments (23) and (24) go through a pair of slots (33A) and (33B) (See FIG. 3) on the sliding element guide (3) and slide along the x-axis during the compression or stretch of the tension spring (1) in the phase of opening and closing of the temple (9).

Figure 3:
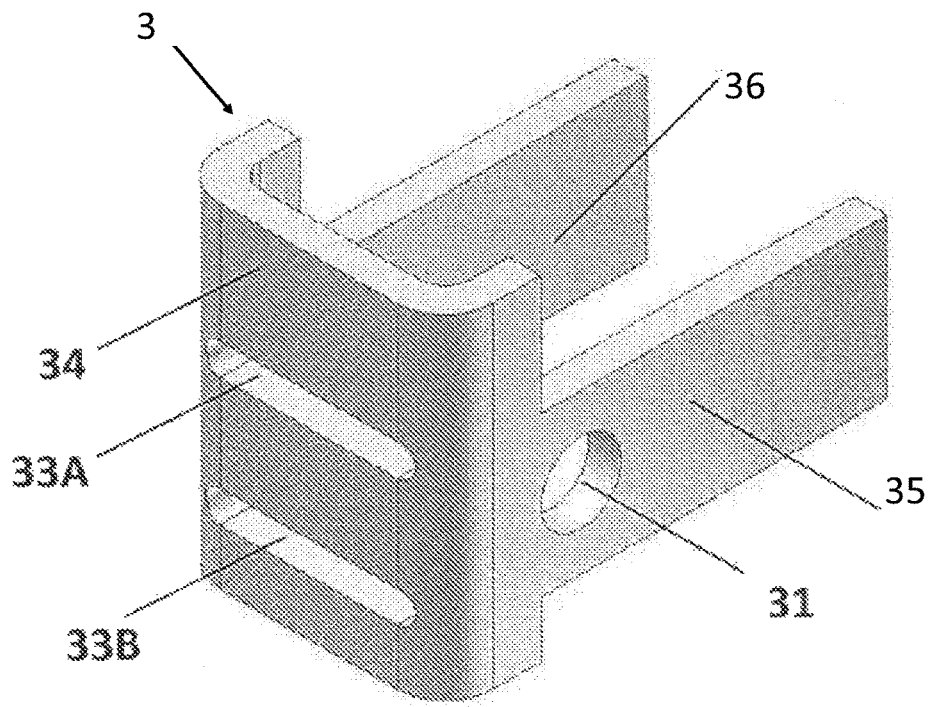
FIG. 3 depicts an embodiment of the sliding element guide disclosed herein.

Referring to FIG. 3, the sliding element guide (3) can be made of any suitable metal such as stainless steel. In some embodiments, the sliding element guide (3) is made of a metal sheet which is bended in the shape of a substantially letter U with sharp edges. The sliding element guide (3) comprises a middle segments (34), a third segment (35) and a fourth segment (36), and slots (33A) and (33B) in the middle segment (34), wherein the sliding element (2) is moving longitudinally in the slots (33A) and (33B). The slots (33A) and (33B) are configured to allow only the longitudinal movement and prevent all the other movements of the sliding element (2). The width of the slots (33A) and (33B) is slightly bigger than the thickness of the material in which the sliding element (2) is made of. In the third segment (35) there is a first guide opening (31), and in the fourth segment (36) there is a second guide opening (32). The third segment (35) and the fourth segment (36) serve as a protection of the temple from wearing during the longitudinal movement of the sliding element (2) in the phase of the hinge operation. The first and second guide openings (31) and (32) serve to fix the sliding element guide (3) to the temple (9).

Figure 4:
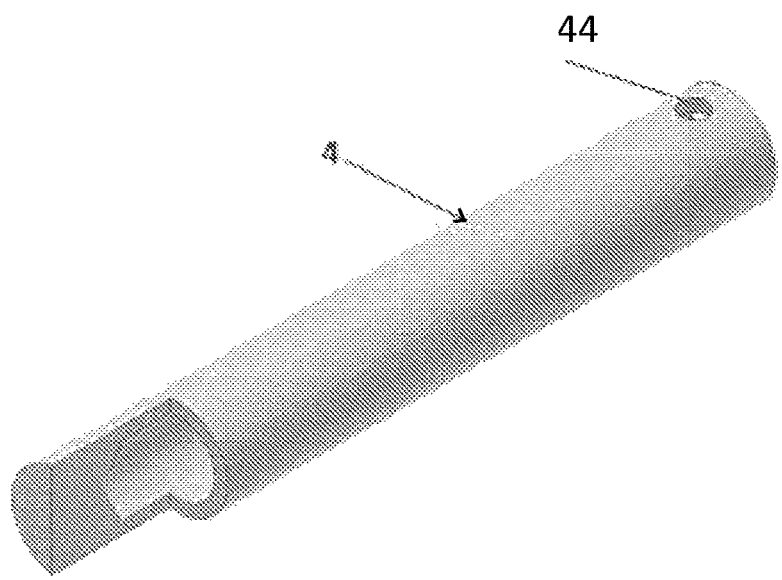
FIG. 4 depicts an embodiment of the spring tensioner disclosed herein.
Figure 6:
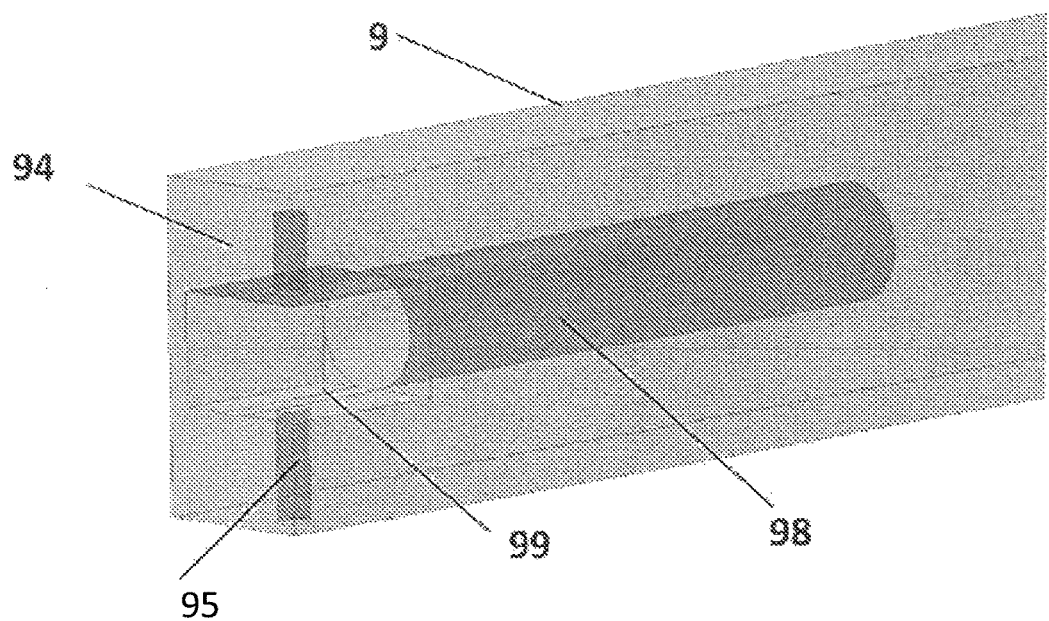
FIG. 6 depicts a part of a temple disclosed herein having a face surface (94), a temple bore (95), a temple cavity (98) and a temple bearing (99).

The spring tensioner (4) can be made in any shape suitable to be installed easily into a cavity (98) in the temple (9) and to engage with the tension spring (1). Some non-limiting examples of suitable shape include hollow cylinder and hollow prisms such as triangular and square prisms. Referring to FIGS. 4, 6 and 8, the spring tensioner (4) is made in the shape of the round pipe or hollow cylinder in order to enable easy installation into a cavity (98) in the temple (9). The spring tensioner (4) comprises a tensioner bearing (44) in which a spring fixing device (41) is mounted. The inner diameter of the pipe of the spring tensioner (4) is larger than the outer diameter of the tension spring (1).

Referring to FIGS. 8 and 9, the stop (5) for stopping the longitudinal movement of the sliding element (2) at the same time serves as an element for fixing the sliding part guide (3) to the temple (9). Any mechanical fastener known in the art can be used as the stop disclosed herein. The stop (5) may be in the form of a pin, rivet, screw or bolt for easy assembly and simple installment into a temple bore (95) in the temple (9). The stop (5) passes through the temple bore (95) in the temple (9) and first and second guide openings (31) and (32) in the sliding element guide (3) so as to fix the sliding part guide (3) to the temple (9). The temple bore (95) is configured to engage with the stop (5). In some embodiments, the stop (5) enters from one side of the temple and does not pass through the opposite side of the temple. In certain embodiments, the stop (5) is a screw.

Figure 7:
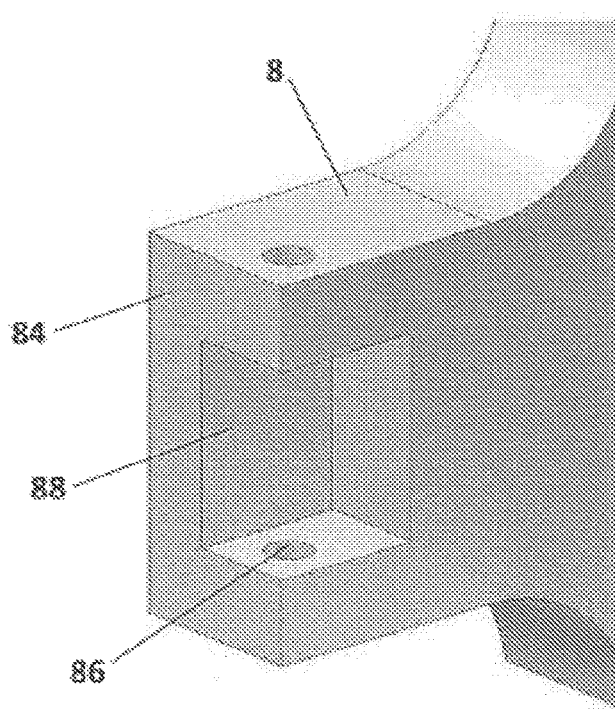
FIG. 7 depicts an embodiment of an end portion of a frame front (8) disclosed herein comprising a frame front bore (86), a frame front bearing (88) and an end (84).

FIG. 7 shows an embodiment of an end portion of a frame front (8) comprising a frame front bore (86), a frame front bearing (88) and an end (84) of the frame front (8).

Referring to FIG. 8, the fastener or bolt (6) fixes the bearing shield (7) to the frame front (8) by passing through a frame front bore (86) in the frame front (8). Any mechanical fastener known in the art can be used as the fastener or bolt disclosed herein. The fastener or bolt (6) may be in the form of a pin, rivet, screw or bolt for easy assembly and simple installment into a frame front bore (86). The fastener (6) installed in the frame front bore (86) also serves to enable the rotation of the sliding element (2) around the body of the fastener (6) in all the positions of the temple (9) where the fastener (6) at the same time fixes the bearing shield (7) to the frame front (8), whereas the bearing shield (7) is installed or embedded in the frame front bearing (88). In some embodiments, the fastener (6) enters from one side of the frame front and does not pass through the opposite side of the frame front. In certain embodiments, the fastener (6) is a screw.

Figure 5:
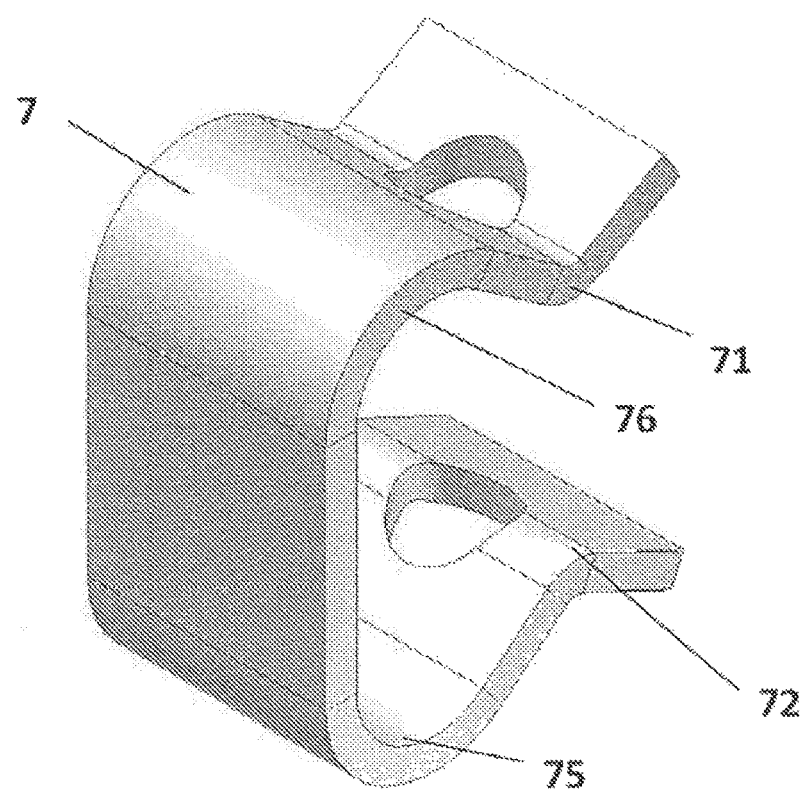
FIG. 5 depicts an embodiment of the bearing shield disclosed herein.

Referring to FIGS. 5 and 8, the bearing shield (7) installed in the frame front bearing (88) on the frame front (8) serves to reduce or eliminate the wearing of the frame front bearing (88) when the frame front (8) is made of plastic or some other material which would be damaged by the vertical movement of the sliding element (2) in the frame front bearing (88) of the frame front (8). The bearing shield (7) comprises or consists of segments (75) and (76) which is configured to enable the vertical movement of the sliding element (2) against the fastener (6), which in turn enables the vertical movement of the temple (9) against the frame front (8). The bearing shield (7) also comprises bearing shield openings (71) and (72) in which the fastener (6) is mounted to fix the bearing shield (7) to the frame front (8). The frame front (8) is a part of a pair of eyeglasses in which the frame front bearing (88) is placed, which, by its shape, suits the outer form of the bearing shield (7) and in which the bearing shield (7) is embedded or assembled. The frame front (8) holds the frame front bore (86) for the fastener (6) which has a precise and defined distance (C) from the end (84) of the frame front (86) to the center of the frame front bore (86), and the precise and defined distance (B) from the inner edge of the frame front (86) to the center of the frame front bore (86).

The bearing shield (7) can be made of any suitable metal, such as stainless steel; or polymer, such as polyacetal, polyethylenes (e.g., ultra-high-molecular-weight polyethylene and high-density polyethylene) or cellulose esters (e.g., cellulose acetate, cellulose acetate butyrate and cellulose acetate propionate). In some embodiments, the bearing shield (7) is made of a metal sheet which is configured to engage with the sliding element (2).

Figure 5A:
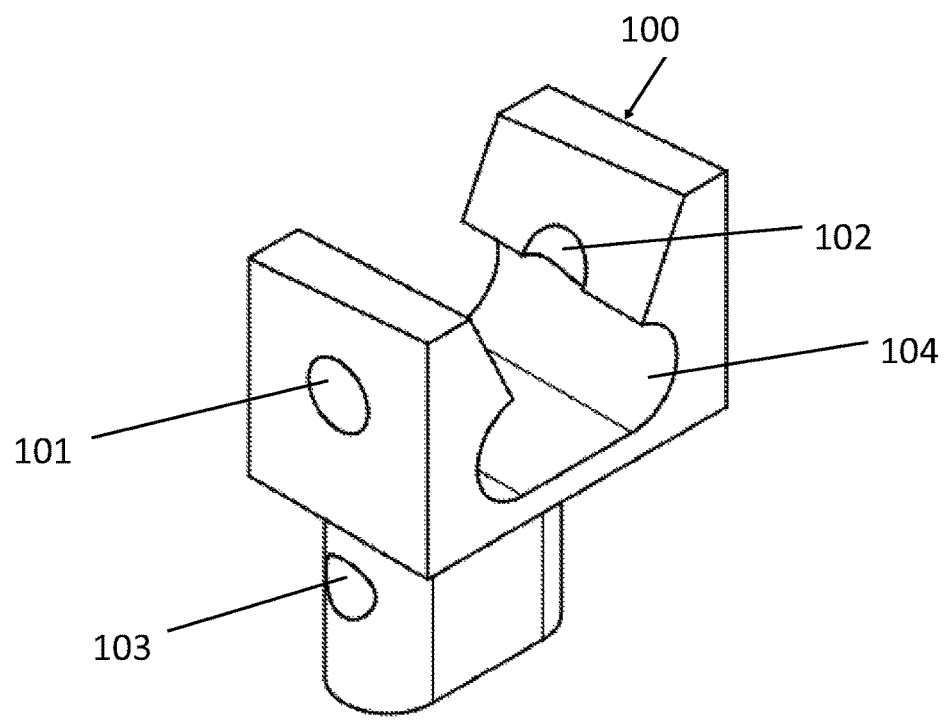
FIG. 5A depicts an embodiment of an alternative to the bearing shield disclosed herein.

FIG. 5A is an embodiment of a flexible hinge connector (100) as an alternative to the frame front bearings for engaging with the bearing shield (7) disclosed herein. The connector (100) comprises a cavity (104) and a pair of connector openings (101) and (102) configured to suit the bearing shield openings (71) and (72) of the bearing shield (7), as well as a connector bore (103) configured to engage with a frame front (not shown) of a pair of eyeglasses. The connector (100) can be made of any suitable metal, such as stainless steel; or polymer, such as polyacetal, polyethylenes (e.g., ultra-high-molecular-weight polyethylene and high-density polyethylene) or cellulose esters (e.g., cellulose acetate, cellulose acetate butyrate and cellulose acetate propionate). In some embodiments, the hinge connector (100) is made of cellulose acetate.

In another aspect, provide herein is a pair of eyeglasses comprising a frame front; a pair of temples; a pair of the flexible hinges of any one of claims 1-11; and a pair of hinge connectors (100), wherein the pair of hinge connectors (100) couple with the pair of flexible hinges to form a pair of extended flexible hinges, and wherein the pair of extended flexible hinges connect the pair of temples to the frame front. In some embodiments, the pair of connector openings (101) and (102) is configured to suit the bearing shield openings (71) and (72) of the bearing shield (7). In certain embodiments, the outer shape and dimensions of the bearing shield (7) are identical to or configured to suit the shape and dimensions of the cavity (104).

Referring to FIG. 6, the temple (9) comprises or consists of a face surface (94), a temple bore (95), a temple cavity (98) and a temple bearing (99). The shape and dimensions of the temple bearing (99) are configured to suit the dimensions and the shape of the sliding element guide (3). Similarly, the shape and dimensions of the temple cavity (98) are configured to suit the dimensions and the shape of the spring compressor (4). The temple bore (95) in which the stop (5) for stopping the longitudinal movement of the sliding element (5) is mounted, is vertically placed against the temple bearing (99).

In one embodiment, the flexible hinge disclosed herein can be assembled by the following procedure. First, the first segment (23) and the second segment (24) of the sliding element (2) go through the slots (33A) and (33B) on the sliding element guide (3). Second, one end (11) of the tension spring (1) is fixed to or engaged with the opening (22) of the sliding element (2). The rest of the tension spring (1) goes through the spring tensioner (4) and then another end (12) of the tension spring (1) is fixed to the fixing device of the spring (41) of the spring tensioner (4) after the tension spring (1) is compressed or stretched to the projected length. In this phase of the assembling, the spring tensioner (4) and the sliding element guide (3) under the pressure or tension of the tension spring (1) are in the permanent contact.

In another embodiment, the temple bearing (99) can be made in the temple (9) by taking out some material. Referring to FIG. 8, the shape and dimensions of the temple bearing (99) are configured to suit the sliding element guide (3) and the temple cavity (98). The shape and dimensions of the temple cavity (98) are configured to suit the shape and dimensions of the spring tensioner (4). The shape and dimensions of the temple bore (95) are configured to suit the stop (5) for stopping the longitudinal movement of the sliding element (2). The installed assembly with compressed or stretched tension spring (1) is placed into the temple bearings (99) and temple cavity (98), and is fixed to the temple (9). The fixing can be carried out in such way that the stop (5), which at the same time serves as an element for fixing the sliding part guide (3) to the temple (9), is mounted in the temple bore (95) on the temple (9) and in first and second guide openings (31) and (32).

Referring to FIG. 8, at the end of the frame front (8), the bearing shield (7) is placed into the frame front bearing (88). The sliding element (2) with its ending (26) is placed into the bearing shield (7). The fastener (6) is placed into the frame front bore (86) at the end of the frame front (8) into the bearing shield openings (71) and (72) installed on the bearing shield (7), and by the sliding of the fastener (6) through the ending (26) of the sliding element (2), the tension spring (1) is additionally compressed or stretched and the face surface (94) of the temple (9) and the end (84) of the frame front (8) get into the flexible contact. This finalizes the assembling of the temple (9) to the frame front (8) because it is not necessary to do any additional adjusting or regulation of the any part related to the flexible hinge disclosed herein.

Figure 10:
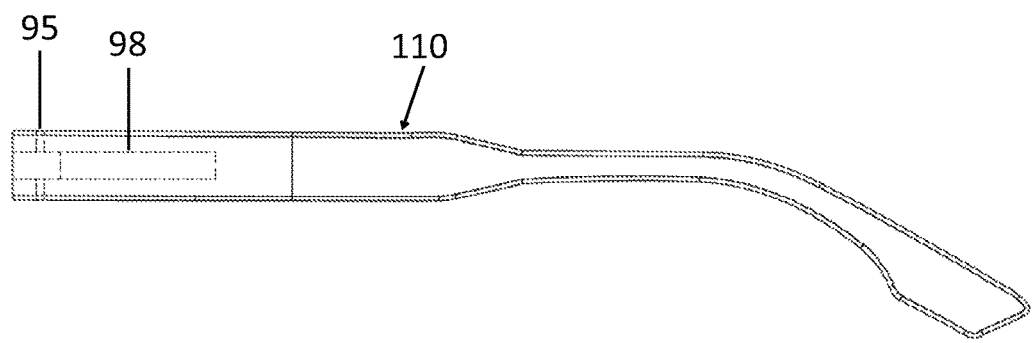
FIG. 10 depicts another embodiment of a temple configured to hold a part of the flexible hinge disclosed herein.

FIG. 10 depicts another embodiment of a temple (110) of a pair of eyeglasses wherein the temple (110) configured to hold a part of the flexible hinge disclosed herein. The temple (110) comprises a temple bore (95), a temple cavity (98) and a temple bearing (99). A stop (5) can pass through first and second guide openings (31) and (32) (not shown) and the temple bore (95) in a temple of a pair of eyeglasses to fix a sliding part guide (3) (not shown) to the temple (110). The shape and dimensions of the temple cavity (98) are identical to or configured to suit the shape and dimensions of the spring tensioner (4). The shape and dimensions of the temple bore (95) are identical to or configured to suit the shape and dimensions of the stop (5).

Figure 11:
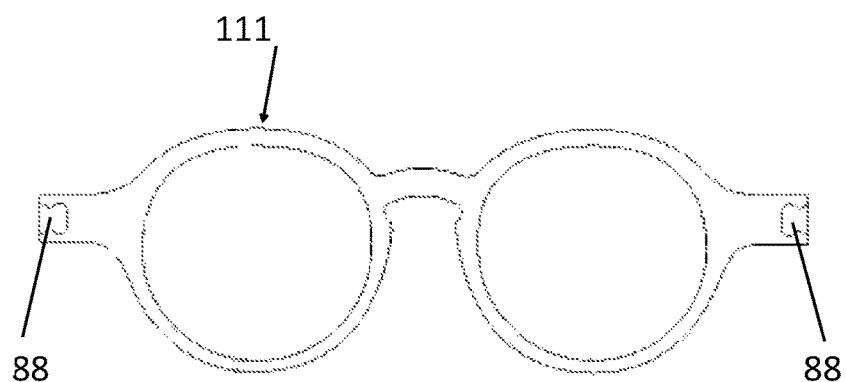
FIG. 11 depicts an embodiment of a front frame configured to hold the bearing shield of the flexible hinge disclosed herein.

FIG. 11 depicts an embodiment of a front frame (111) configured to hold or engage with the bearing shield of the flexible hinge disclosed herein. The front frame (111) comprises a pair of frame front bearings (88) for engaging with a pair of bearing shields disclosed herein. A pair of bearing shields (not shown) can be embedded into the pair of frame front bearings (88), wherein the outer shape and dimension of each of the bearing shields are identical to or configured to suit the shape and dimension of each of the frame front bearings (88).

This invention is ideal for all types of glasses which are made of plastic and which goal is to protect the final user in case of accidental situations such as explosions of the car air bags or accidents during sports activities. It can be also applied for glasses where it is desirable to achieve saving and at the same time avoid unreliable ways of connecting elements like welding. The application of this invention also implies a possibility not to color glasses if they are made of anti-allergenic materials, because the parts that make a flexible hinge are not thermally processed and are completely hidden in the temple of the glasses. As the tension spring of significantly higher capacity than the traditional flexible hinges can be mounted into a temple having standard dimensions, this invention is ideal for wide temples which have large weight.

Although the foregoing embodiments have been described in some detail for purposes of clarity of understanding, it will be apparent that certain changes and modifications may be practiced within the scope of the appended claims. It should be noted that there are many alternative ways of implementing the processes, systems and apparatus of the present embodiments. Accordingly, the present embodiments are to be considered as illustrative and not restrictive, and the embodiments are not to be limited to the details given herein.

What is claimed is:

1. A flexible hinge comprising:
   a) a tension spring (1) having two ends (11) and (12);
   b) a sliding element (2) having a first segment (23), a second segment (24), and an ending (26) between the first segment (23) and the second segment (24), wherein there is an opening (22) near the end of one of the first and second segments, and wherein the opening (22) is configured to engage with one end of the tension spring (1);
   c) a sliding element guide (3) comprising a third segment (35), a fourth segment (36), a middle segments (34) between the third segment (35) and the fourth segment (36), and a pair of slots (33A) and (33B) in the middle segment (34), wherein the pair of slots (33A) and (33B) are configured to allow the first and second segments of the sliding element (2) to slide through, and wherein there is a first guide opening (31) and a second guide opening (32) in the third segment (35) and the fourth segment (36) respectively;
   d) a spring tensioner (4) having a spring fixing device at one end configured to engage with the other end of the tension spring (1);
   e) a stop (5) for stopping the longitudinal movement of the sliding element (2), wherein the stop (5) passes through the first guide opening (31) and second guide opening (32) in the sliding element guide (3);
   f) a fastener (6); and
   g) a bearing shield (7) having a pair of bearing shield openings (71) and (72), wherein the fastener (6) goes through the bearing shield openings (71) and (72) and the ending (26) to engage the bearing shield (7) with the rest of the flexible hinge.

2. The flexible hinge of claim 1, wherein the spring tensioner (4), the sliding element guide (3), the sliding element (2) and the tension spring (1) are in permanent contact.

3. The flexible hinge of claim 1, wherein the opening (22) of the sliding element (2) engages with one end of the tension spring (1), wherein the first segment (23) and the second segment (24) of the sliding element (2) slide through the pair of slots (33A) and (33B) of the sliding element guide (3), and wherein the other end of the tension spring (1) is pulled by force through the spring tensioner (4) and fixed to a tensioner bearing (44) of the spring tensioner (4).

4. The flexible hinge of claim 1, wherein the stop (5) passes through first and second guide openings (31) and (32) and a temple bore in a temple of a pair of eyeglasses to fix the sliding part guide (3) to the temple.

5. The flexible hinge of claim 1, wherein the slots (33A) and (33B) are configured to allow only the longitudinal movement of the sliding element (2), and to prevent all the other movements of the sliding element (2).

6. The flexible hinge of claim 1, wherein the width of the slots (33A) or (33B) is slightly bigger than the thickness of the first segment (23) or the second segment (24).

7. The flexible hinge of claim 1, wherein the bearing shield (7) is embedded in a frame front bearing in one end of a frame front of a pair of eyeglasses, wherein the outer shape and dimensions of the bearing shield (7) are identical to or configured to suit the shape and dimensions of the frame front bearing.

8. The flexible hinge of claim 1, wherein the fastener (6) goes through the bearing shield openings (71) and (72) and the ending (26), and fixes the bearing shield (7) to one end of a frame front of the pair of eyeglasses.

9. The flexible hinge of claim 1, wherein the spring tensioner (4) is in the shape of a round tube.

10. The flexible hinge of claim 9, wherein the inner diameter of the spring tensioner (4) is larger than the outer diameter of the tension spring (1).

11. A pair of eyeglasses comprising a frame front (111); a pair of temples (110); and a pair of the flexible hinges of claim 1, wherein the pair of the flexible hinges connect the pair of temples (110) to the frame front (111).

12. The pair of eyeglasses of claim 11, wherein the right and left ends of the frame front (111) comprise a pair of frame front bearings (88), wherein the bearing shield (7) of each of the flexible hinges is embedded in one of the frame front bearings (88).

13. The pair of eyeglasses of claim 12, wherein the outer shape and dimensions of the bearing shield (7) are identical to or configured to suit the shape and dimensions of the frame front bearing.

14. The pair of eyeglasses of claim 11, wherein each of the pair of temples (110) has a temple bore (95), and wherein the stop (5) passes through first and second guide openings (31) and (32) and a temple bore (95) to fix the sliding part guide (3) to the temple (110).

15. The pair of eyeglasses of claim 11, wherein the fastener (6) goes through the bearing shield openings (71) and (72) of the bearing shield (7) and the ending (26) of the sliding element (2), and fixes one of the flexible hinges to one end of the frame front.

16. A pair of eyeglasses comprising a frame front; a pair of temples; a pair of the flexible hinges of claim 1; and a pair of hinge connectors (100), wherein the pair of hinge connectors couple with the pair of flexible hinges to form a pair of extended flexible hinges, and wherein the pair of extended flexible hinges connect the pair of temples to the frame front.

17. The pair of eyeglasses of claim 16, wherein each of the hinge connector (100) comprises a cavity (104), a pair of connector openings (101) and (102) and a connector bore (103), wherein the pair of connector openings (101) and (102) is configured to suit the bearing shield openings (71) and (72) of the bearing shield (7) and the connector bore (103) is configured to engage with the frame front.

18. The pair of eyeglasses of claim 17, wherein the outer shape and dimensions of the bearing shield (7) are identical to or configured to suit the shape and dimensions of the cavity (104).

* * * * *